(12) United States Patent
Lundberg et al.

(10) Patent No.: US 8,402,855 B2
(45) Date of Patent: Mar. 26, 2013

(54) HYDRAULIC CONTROL SYSTEMS FOR DUAL CLUTCH TRANSMISSIONS

(75) Inventors: Philip C. Lundberg, Keego Harbor, MI (US); Bret M. Olson, Whitelake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 567 days.

(21) Appl. No.: 12/685,489

(22) Filed: Jan. 11, 2010

(65) Prior Publication Data
US 2011/0168510 A1 Jul. 14, 2011

(51) Int. Cl.
*F16H 59/00* (2006.01)
(52) U.S. Cl. ............................................. 74/335; 74/330
(58) Field of Classification Search .................... 74/330, 74/331, 335
See application file for complete search history.

(56) References Cited

U.S. PATENT DOCUMENTS

| | | | |
|---|---|---|---|
| 3,834,499 A | 9/1974 | Candellero et al. | |
| 4,495,839 A * | 1/1985 | Morscheck | 477/142 |
| 4,653,352 A | 3/1987 | Nakao et al. | |
| 4,805,750 A * | 2/1989 | Nitz | 192/3.58 |
| 4,944,202 A | 7/1990 | Gierer | |
| 5,054,369 A * | 10/1991 | Wardle et al. | 91/361 |
| 5,329,826 A * | 7/1994 | Graves et al. | 74/335 |
| 5,441,459 A | 8/1995 | Inukai et al. | |
| 5,588,327 A * | 12/1996 | Downs et al. | 74/335 |
| 5,851,164 A * | 12/1998 | Habuchi et al. | 477/127 |
| 6,343,520 B1 * | 2/2002 | Ohashi et al. | 74/335 |
| 6,698,304 B2 | 3/2004 | Gierling et al. | |
| 6,715,597 B1 | 4/2004 | Buchanan et al. | |
| 6,789,658 B2 | 9/2004 | Busold et al. | |
| 6,827,191 B2 | 12/2004 | Kuhstrebe | |
| 6,883,394 B2 * | 4/2005 | Koenig et al. | 74/335 |
| 6,941,830 B2 | 9/2005 | Ibamoto et al. | |
| 7,300,375 B2 | 11/2007 | Petrzik | |
| 7,401,689 B2 | 7/2008 | Hegerath et al. | |
| 7,464,617 B2 | 12/2008 | Baldascini et al. | |
| 7,464,618 B2 | 12/2008 | Mohlmann et al. | |
| 7,472,616 B2 | 1/2009 | Dreher et al. | |
| 7,478,572 B2 | 1/2009 | Maten et al. | |
| 7,487,866 B2 | 2/2009 | Kruse et al. | |
| 7,591,203 B2 | 9/2009 | Ochi et al. | |
| 7,736,269 B2 * | 6/2010 | Long et al. | 477/130 |
| 2001/0036878 A1 | 11/2001 | Itou et al. | |
| 2002/0060113 A1 | 5/2002 | Harries | |
| 2002/0119864 A1 | 8/2002 | Harries | |
| 2003/0075408 A1 | 4/2003 | Alfredsson | |
| 2003/0226416 A1 | 12/2003 | Umemoto et al. | |
| 2004/0038765 A1 | 2/2004 | Fujimine et al. | |
| 2005/0067251 A1 | 3/2005 | Braford, Jr. et al. | |

(Continued)

FOREIGN PATENT DOCUMENTS

DE 2141564 A1 2/1973
DE 4117736 C1 5/1992

(Continued)

*Primary Examiner* — Ha D. Ho

(57) ABSTRACT

Hydraulic control systems for a dual clutch transmission include a regulated source of pressurized hydraulic fluid including an electric pump, a filter and an accumulator, a pair of pressure control valves and a branching hydraulic circuit including pressure or flow control valves, spool or logic valves and two position valves which collectively supply and exhaust hydraulic fluid from a plurality of shift actuators. The actuators are connected to shift rails which include shift forks and are slidable to engage synchronizers and positive clutches associated with the various gear ratios.

18 Claims, 7 Drawing Sheets

U.S. PATENT DOCUMENTS

| | | |
|---|---|---|
| 2005/0107214 A1 | 5/2005 | Koenig |
| 2007/0175726 A1 | 8/2007 | Combes et al. |
| 2008/0176700 A1* | 7/2008 | Long et al. .................... 475/116 |
| 2008/0207392 A1 | 8/2008 | Staudinger et al. |
| 2008/0210032 A1 | 9/2008 | Uberti et al. |
| 2008/0223683 A1 | 9/2008 | Grethel |
| 2009/0000897 A1 | 1/2009 | Staudinger et al. |
| 2009/0151495 A1 | 6/2009 | Garabello et al. |
| 2009/0157271 A1 | 6/2009 | Garabello et al. |

FOREIGN PATENT DOCUMENTS

| | | |
|---|---|---|
| DE | 4320353 A1 | 1/1994 |
| DE | 29714652 U1 | 10/1997 |
| DE | 19921301 A1 | 11/1999 |
| DE | 19849488 A1 | 5/2000 |
| DE | 19931973 A1 | 1/2001 |
| DE | 10125172 A1 | 11/2002 |
| DE | 10134115 A1 | 1/2003 |
| DE | 10134115 A1 | 1/2003 |
| DE | 10243282 A1 | 4/2004 |
| DE | 102005029963 A1 | 2/2007 |
| DE | 102005029964 A1 | 3/2007 |
| DE | 102008008454 A1 | 9/2008 |
| DE | 102008058692 A1 | 6/2009 |
| EP | 0477564 A2 | 4/1992 |
| EP | 1400733 A2 | 3/2004 |
| EP | 1433976 A1 | 6/2004 |
| EP | 1469235 A1 | 10/2004 |
| EP | 1519082 A1 | 3/2005 |
| EP | 1589262 A1 | 10/2005 |
| EP | 1645786 A2 | 4/2006 |
| EP | 1767824 A1 | 3/2007 |
| EP | 2151586 A2 | 2/2010 |
| FR | 2808065 A1 | 10/2001 |
| JP | 58102851 A | 8/1983 |
| JP | 2007010145 A | 1/2007 |
| WO | WO9705410 A1 | 2/1997 |
| WO | WO9919644 A1 | 4/1999 |
| WO | WO2004097265 A1 | 11/2004 |
| WO | WO2009037170 A1 | 3/2009 |
| WO | WO2010028745 A2 | 3/2010 |

* cited by examiner

HYDRAULIC CONTROL SYSTEMS FOR DUAL CLUTCH TRANSMISSIONS

FIELD

The present disclosure relates to hydraulic control systems and more particularly to hydraulic control systems and their components for dual clutch transmissions.

BACKGROUND

The statements in this section merely provide background information related to the present disclosure and may or may not constitute prior art.

In automotive transmission art, the dual clutch transmission (DCT) is a relatively new concept. A typical dual clutch transmission configuration includes a pair of mutually exclusively operating input clutches which drive a pair of input shafts. The input shafts may be disposed on opposite sides of an output shaft or may be disposed concentrically between spaced-apart output shafts. One of each of a plurality of pairs of constantly meshing gears which provide the various forward and reverse gear ratios is freely rotatably disposed on one of the shafts and the other of each pair of gears is coupled to one of the other shafts. A plurality of synchronizer clutches selectively couple the freely rotatable gears to the associated shaft to achieve forward and reverse gear ratios. After the synchronizer clutch is engaged, the input clutch associated with the input shaft having the engaged synchronizer clutch is applied to transmit power through the transmission. Reverse gear is similarly achieved except that it includes an additional (idler) gear to provide torque reversal.

Dual clutch transmissions are known for their sporty, performance oriented operating characteristics which mimic those of a conventional (manual) transmission. They also typically exhibit good fuel economy due to their good gear mesh efficiency, ratio selection flexibility, reduced clutch losses and the lack of a torque converter.

There are several design considerations unique to dual clutch transmissions, for example, the input clutches must be of relatively large size because of heat generated during clutch slip. Furthermore, such heat generation typically requires correspondingly larger and more complex cooling components capable of dissipating relatively large quantities of heat. Finally, because such transmissions typically have many sets of axially aligned, meshing gears, their overall length may limit their use to certain vehicle designs.

Control of the input clutches and selection and engagement of a particular gear by translation of a synchronizer and associated positive clutch is typically achieved by a hydraulic control system. Such a system, itself under the control of an electronic transmission control module (TCM), includes hydraulic valves and actuators which engage the synchronizers and gear clutches. Optimum operating efficiency and thus fuel efficiency and minimal heat generation can be achieved by designing such hydraulic control systems to exhibit low leakage and positive control characteristics. The present invention is so directed.

SUMMARY

The present invention comprehends two embodiments of a hydraulic control system for a dual clutch transmission having three countershafts, a third, idler shaft and five shift rails and hydraulic actuators. The hydraulic control systems include a regulated source of pressurized hydraulic fluid including a pump, a filter and an accumulator, a pair of pressure control valves and a branching hydraulic circuit including pressure or flow control valves, spool or logic valves and two position valves which collectively supply and exhaust hydraulic fluid from a plurality of shift actuators. The actuators are connected to shift rails which include shift forks and are slidable to engage synchronizers and positive clutches associated with the various gear ratios.

The embodiments incorporate two essentially independent control systems supplied with hydraulic fluid through two independently operating valves. The two independent control systems are associated with the input clutch operators and the gear shift logic valves and actuators. When the transmission is operating in a normal ascending or descending gear selection sequence, this configuration permits pre-staging or pre-selection of a gear associated with one countershaft while a gear associated with the other countershaft is engaged and transmitting torque. Furthermore, if a component or components associated with one countershaft fail, the other countershaft and the alternating (i.e., first, third, fifth) selection of gear ratios it provides will still be fully operational—a highly desirable failure mode.

The hydraulic control systems according to the present invention are less complex and expensive relative to competing systems, provide improved control through interconnected logic valves which reduce the likelihood of engaging a wrong or multiple gears and provide reduced energy consumption by allowing shut-down of portions of the control system during steady state operation. Certain embodiments of the control system utilize pairs of pressure or flow control valves to control pressure on both sides of shift actuator pistons which provides better control and improved shifts.

Thus it is an object of the present invention to provide a hydraulic control system for a dual clutch automatic transmission.

It is a further object of the present invention to provide a hydraulic control system for a dual clutch transmission having a plurality of spool or logic valves and hydraulic actuators.

It is a still further object of the present invention to provide a hydraulic control system for a dual clutch transmission having a plurality of two position solenoid valves (on-offs), spool valves and hydraulic actuators.

It is a still further object of the present invention to provide a hydraulic control system for a dual clutch transmission having a plurality of flow or pressure control valves, two position solenoid valves, logic or spool valves and hydraulic actuators.

It is a still further object of the present invention to provide a hydraulic control system for a dual clutch transmission comprising two essentially independent hydraulic systems, one associated with clutch operation and the other associated with gear selection.

It is a still further object of the present invention to provide a hydraulic control system for a dual clutch transmission having a pair of input clutches associated with a pair of concentric input shafts and a pair of countershafts.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
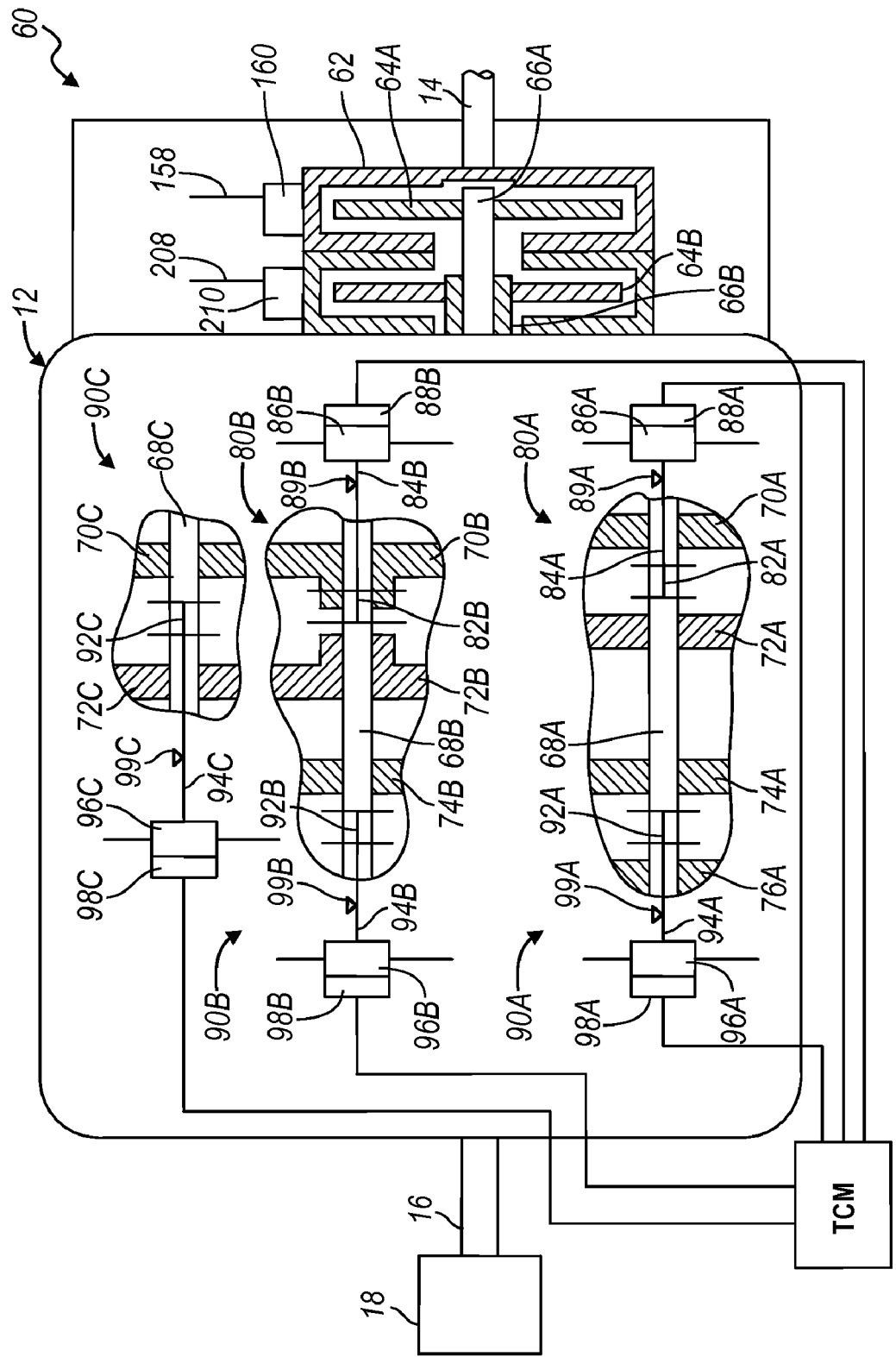
FIG. 1 is a pictorial view of an exemplary dual clutch automatic transmission with portions broken away incorporating a hydraulic control system according to the present invention having five shift actuator assemblies.

With reference to FIG. 1, an exemplary dual clutch automatic transmission incorporating the present invention is illustrated and generally designated by the reference number 60. The dual clutch transmission 60 includes a typically cast, metal housing 12 which encloses and protects the various components of the transmission 60. The housing 12 includes a variety of apertures, passageways, shoulders and flanges (not illustrated) which position and support the components of the transmission 60. The transmission 60 includes an input shaft 14 which receives motive power from a prime mover (not illustrated) such as an internal combustion gas or Diesel engine or a hybrid or electric power plant and a single or double output shaft 16 which drives a final drive assembly 18 which may include a propshaft, a differential and drive axles. The input shaft 14 is coupled to and drives a clutch housing 62. The clutch housing 62, in turn, drives a pair of concentrically disposed dry input clutches, a first input clutch 64A and a second input clutch 64B which are mutually exclusively engaged to provide drive torque to a respective pair of concentric input members, a first or inner input shaft 66A and a second or outer hollow input shaft or quill 66B.

Secured to and rotating with each of the input members 66A and 66B are a plurality of helical or spur gears (not illustrated) which are in constant mesh with helical or spur gears which are freely rotatably disposed on a first layshaft or countershaft 68A and a parallel, second layshaft or countershaft 68B. Adjacent and parallel to the second countershaft is a third layshaft or countershaft 68C. A first drive gear meshes with a first driven gear 70A on the first countershaft 68A. A second drive gear meshes with a second driven gear 72A on the first countershaft 68A. A third drive gear meshes with a third driven gear 74A on the first countershaft 68A. A fourth drive gear meshes with a fourth driven gear 76A on the first countershaft 68A. A fifth driven gear 70B on the second countershaft 68B meshes with a fifth drive gear 70C on the third countershaft 68C. The second drive gear also meshes with a sixth driven gear 72B on the second countershaft 68B which meshes with a seventh driven gear 72C on the third countershaft 68C. An eighth drive gear meshes with an eighth driven gear 74B on the second countershaft 68B.

Disposed either adjacent certain single gears or between adjacent pairs of gears on the countershafts 68A, 68B and 68C are synchronizer clutch assemblies. Each synchronizer clutch assembly, in accordance with conventional practice, includes a synchronizer assembly which, when activated, synchronizes the speed of a gear to that of the associated countershaft and a positive clutch, such as a dog or face clutch, which positively connects the gear to the shaft. Thus, between the driven gears 70A and 72A on the first countershaft 68A is a first shift actuator and synchronizer clutch assembly 80A having a double, i.e., back-to-back, first synchronizer clutch 82A which selectively and exclusively synchronizes and engages one of the gears 70A and 72A to the first countershaft 68A. The first synchronizer clutch 82A is bi-directionally translated by a first shift rail and fork assembly 84A which, in turn, is translated by a first shift actuator assembly 86A. The real time position of the first synchronizer clutch 82A and the first shift rail and fork assembly 84A is sensed by a first linear position sensor 88A which preferably provides a continuous, i.e., proportional, output signal to a transmission control module TCM indicating the position of the first synchronizer clutch 82A.

Between the fifth driven gear 70B and the sixth driven gear 72B on the second countershaft 68B is a second shift actuator and synchronizer clutch assembly 80B having a single synchronizer clutch 82B which synchronizes and couples the driven gears 70B and 72B together. The second synchronizer clutch 82B is bi-directionally translated by a second shift rail and fork assembly 84B which, in turn, is translated by a second shift actuator assembly 86B. The real time position of the second synchronizer clutch 82B and the second shift rail and fork assembly 84B is sensed by a second linear position sensor 88B which preferably provides a continuous, i.e., proportional, output signal to the transmission control module TCM indicating the position of the second synchronizer clutch 82B.

Between the driven gears 74A and 76A on the first countershaft 68A is a third shift actuator and synchronizer clutch assembly 90A having a double, i.e., back-to-back, third synchronizer clutch 92A which selectively and exclusively synchronizes and engages one of the gears 74A and 76A to the first countershaft 68A. The third synchronizer clutch 92A is bi-directionally translated by a third shift rail and fork assembly 94A which, in turn, is translated by a third shift actuator assembly 96A. The real time position of the third synchronizer clutch 92A and the third shift rail and fork assembly 94A is sensed by a third linear position sensor 98A which preferably provides a continuous, i.e., proportional, output signal to the transmission control module TCM indicating the position of the third synchronizer clutch 92A.

Adjacent the eighth driven gear 74B on the second countershaft 68B is a fourth shift actuator and synchronizer clutch assembly 90B having a single synchronizer clutch 92B which synchronizes and couples the eighth driven gear 74B to the second countershaft 68B. The fourth synchronizer clutch 92B is bi-directionally translated by a fourth shift rail and fork assembly 94B which, in turn, is translated by a fourth shift actuator assembly 96B. The real time position of the fourth synchronizer clutch 92B and the fourth shift rail and fork assembly 94B is sensed by a fourth linear position sensor 98B which preferably provides a continuous, i.e., proportional, output signal to the transmission control module TCM indicating the position of the fourth synchronizer clutch 92B.

Finally, between the fifth drive gear 70C and the seventh driven gear 72C on the third countershaft 68C is a fifth shift actuator and synchronizer clutch assembly 90C having a double, i.e., back-to-back, synchronizer clutch 92C which selectively and exclusively synchronizes and engages one of the gears 72C to the third countershaft 68C or couples the driven gear 72C to the drive gear 70C. The fifth synchronizer clutch 92C is bi-directionally translated by a fifth shift rail and fork assembly 94C which, in turn, is translated by a fifth shift actuator assembly 96C. The real time position of the fifth synchronizer clutch 92C and the fifth shift rail and fork assembly 94C is sensed by a fifth linear position sensor 98C which preferably provides a continuous, i.e., proportional, output signal to the transmission control module TCM indicating the position of the fifth synchronizer clutch 92C. It should be appreciated that the linear position sensors 88A, 88B, 98A, 98B and 98C may be replaced with other sensors such as two or three position switches or open loop control with system characterization.

Additionally, a detent mechanism may be employed with each of the shift assemblies to assist obtaining and maintaining a gear or speed ratio once it is selected and to assist obtaining and maintaining the synchronizer clutch in neutral, i.e., an unengaged position. Thus, a first detent assembly 89A may be operatively associated with the first shift actuator and synchronizer clutch assembly 80A. A second detent assembly 89B may be operatively associated with the second shift actuator and synchronizer clutch assembly 80B. A third detent assembly 99A may be operatively associated with the third shift actuator and synchronizer clutch assembly 90A. A fourth detent assembly 99B may be operatively associated with the fourth shift actuator and synchronizer clutch assembly 90B and a fifth detent assembly 99C may be operatively associated with the fifth shift actuator and synchronizer clutch assembly 90C.

It will be appreciated that the transmission 60 illustrated and described above is laid out with four forward gears on one countershaft and the remaining (three) forward gears and reverse on two other countershafts. It is thus capable of providing seven forward speeds and reverse. Similar configurations, all deemed to be within the scope of this invention may, for example, include six forward speeds (or gears) and one or two reverse speeds (or gears) or five forward speeds and one or two reverse speeds.

It should be understood that while the present invention is directed to hydraulic control systems for dual clutch transmissions, such systems are typically controlled by sensor signals and memory, software and one or more microprocessors contained in a transmission control module TCM. Thus, the transmission control module TCM includes a plurality of inputs which receive data from, for example, the linear position sensors, the speed sensors and the pressure sensor, and a plurality of outputs which control and modulate, for example, the positions of the clutches, pressure and flow control valves, logic solenoid valves and shift rails.

Referring now to FIGS. 1, 2A, 2B and 2C, a first embodiment of a hydraulic control system for the dual clutch automatic transmission 60 described above is illustrated and designated by the reference number 2000. The hydraulic control system 2000 includes a sump 102 to which hydraulic fluid returns and collects from various components and regions of the automatic transmission 60. A suction line 104 which may include a filter 106 communicates with the inlet port 108 of an engine driven or electric pump 110 which may be, for example, a gear pump, a vane pump, a gerotor pump or other positive displacement pump. An outlet port 112 of the pump 110 provides hydraulic fluid under pressure in a supply line 114 to a spring biased blow-off safety valve 116 and to a pressure side filter 118 which is disposed in parallel with a spring biased check valve 120. The safety valve 116 is set at a relatively high predetermined pressure and if the pressure in the supply line 114 exceeds this pressure, the safety valve 116 opens momentarily to relieve and reduce it. If pressure ahead of the filter 118 rises to a predetermined differential pressure, indicating a partial blockage or flow restriction when cold of the filter 118 and the possibility that insufficient hydraulic fluid may be provided in an outlet line 122 to the remainder of the control system 2000, the check valve 120 opens to allow hydraulic fluid to bypass the filter 118.

A second check valve 124, in the outlet line 122, is configured to maintain hydraulic pressure in a main supply line 126 and to prevent backflow through the pump 110. The main supply line 126 supplies pressurized hydraulic fluid to an accumulator 130 having a piston 132 and a biasing compression spring 134. The accumulator 130 may be one of many other designs such as gas charged. The accumulator 130 stores pressurized hydraulic fluid and supplies it to the main supply line 126, to a main or system pressure sensor 136 and to the other components of the control system 2000 thereby eliminating the need for the engine driven or electric pump 110 to run continuously. The main pressure sensor 136 reads the delivered hydraulic system pressure in real time and provides this data to the transmission control module TCM.

It should be appreciated that the other embodiment of the hydraulic control system according to the present invention preferably includes the same hydraulic supply, filtration and control components just described. Accordingly, these components will be only briefly described in connection with the subsequent figures and embodiment, it being understood that the above description may be referenced to provide details of these components.

The first embodiment 2000 of the hydraulic control system is divided into a clutch operating portion and gear selection portion. As such, the first main supply line 126A communicates with the inlet port 140A of a first pressure control solenoid valve 140. An outlet port 140B of the first pressure control solenoid valve 140 connects to a supply line 2002 and a first manifold 2004. The first manifold 2004 has a first branch 2004A which communicates with an inlet port 154A of a first electric pressure or flow clutch control solenoid valve 154. The first clutch control solenoid valve 154 also includes an outlet port 154B and an exhaust port 154C which communicates with the sump 102. The outlet port 154B provides hydraulic fluid through an orifice 156 to the first clutch piston and cylinder assembly 160 having the cylinder 162 and the piston 164 slidably disposed therein. It should be appreciated that the orifice 156 and other orifices can be added or omitted without departing from the scope of this invention. A check valve 166 is connected between the first piston and cylinder assembly 160 and a second branch 2004B of the first manifold 2004.

A third branch 2004C of the first manifold 2004 communicates with an inlet port 204A of the second electric pressure or flow clutch control solenoid valve 204. The second clutch control solenoid valve 204 also includes an outlet port 204B and an exhaust port 204C which communicates with the sump 102. The outlet port 204B of the second clutch control solenoid valve 204 provides hydraulic fluid through an orifice 206 to a second clutch piston and cylinder assembly 210 having a cylinder 212 and a piston 214 slidably disposed therein. A check valve 216 is connected between the second piston and cylinder assembly 210 and a fourth branch 2004D of the manifold 2004. It should be noted the check valves 166 and 216 could be eliminated depending upon the system requirements.

The second main supply line 126B communicates with an inlet port 190A of a second pressure control solenoid valve 190. An outlet port 190B connects to a second manifold 2012. A first branch 2012A of the second manifold 2012 communicates with an inlet port 2018A of a first two position (on-off) solenoid valve 2018. An outlet port 2018B of the first two position solenoid valve 2018 communicates with a first inlet port 2020A of a first spool or logic valve 2020 and an exhaust port 2018C of the first two position (on-off) solenoid valve 2018 communicates with the sump 102.

A second branch 2012B of the second manifold 2012 communicates with an inlet port 2022A of a first pressure or flow control solenoid valve 2022. The first pressure or flow control solenoid valve 2022 has an outlet port 2022B which communicates with a second inlet port 2020B of the first spool or logic valve 2020. An exhaust port 2022C of the first pressure or flow control solenoid valve 2022 communicates with the sump 102. A third branch 2012C of the second manifold 2012 communicates with an inlet port 2026A of a second pressure or flow control solenoid valve 2026 having an outlet port 2026B which communicates with a third inlet port 2020C of the first spool or logic valve 2020. An exhaust port is associated with each of the inlet ports 2020A, 2020B and 2020C which communicates with the sump 102. An exhaust port 2026C of the second pressure or flow control solenoid valve 2026 also communicates with the sump 102.

A fourth branch 2012D of the second manifold 2012 communicates with an inlet port 2028A of a second two position solenoid valve 2028. An outlet port 2028B of the second two position (on-off) solenoid valve 2028 is connected to a control port 2020D of the first logic valve 2020 and an exhaust port 2028C of the second two-position solenoid valve 2028 is connected to the sump 102. A fifth branch 2012E of the second manifold 2012 communicates with an inlet port 2032A of a third two position (on-off) solenoid valve 2032.

The first spool or logic valve 2020 also includes a first outlet port 2020E which is connected by a hydraulic line 2036 to a control port 2040B of a second spool or logic valve 2040 as well as a second port 2050B of a second piston and cylinder assembly 2050. A third outlet port 2020G is connected by a line 2038 to a first inlet port 2040A of the second logic valve 2040. The second logic valve 2040 includes a pair of exhaust ports 2040C and 2040D and a first outlet port 2040E that communicates through a line 2042 with a first port 2044A of a first, preferably dual area piston and cylinder assembly 2044 which translates the first shift rail and fork assembly 84A. A second port 2044B at the other end of the first piston and cylinder assembly 2044 communicates with the fifth outlet port 2020I of the first logic valve 2020 through a line 2046. A second outlet port 2040F of the second logic valve 2040 communicates through a line 2048 to a first port 2050A at the other end of the second piston and cylinder assembly 2050 which translates the second shift rail and fork assembly 84B.

A second outlet port 2020F of the first logic valve 2020 is connected through a line 2052 to a control port 2054C of a third spool or logic valve 2054 and a port 2060B at one end of a third, preferably dual area piston and cylinder assembly 2060 which translates the third shift rail and fork assembly 94A. The sixth outlet port 2020J of the first logic valve 2020 is connected through a line 2056 to a first inlet port 2054A of the third logic valve 2054 which also includes a pair of exhaust ports. A first outlet port 2054D of the third logic valve 2054 communicates through a line 2062 to a second inlet port 2064B of a fourth spool or logic valve 2064. A second outlet port 2054E communicates through a line 2058 to a port 2060A at the other end of the third piston and cylinder assembly 2060. A fourth outlet port 2020H of the first logic valve 2020 is connected by a line 2066 with a first inlet port 2064A of the fourth logic valve 2064. The fourth logic valve 2064 includes a control port 2064C which is connected by a line 2068 to the outlet port 2032B of the third two position solenoid valve 2032.

The fourth logic valve 2064 includes three exhaust ports 2064D, 2064E and 2064F alternating with the inlet ports 2064A and 2064B which communicate with the sump 102 and a first outlet port 2064G which is connected to a port 2070A one end of a fourth piston and cylinder assembly 2070 by a line 2072. A port 2070B at the other end of the fourth piston and cylinder assembly 2070 is connected to a third outlet port 2064H by a line 2074. The fourth piston and cylinder assembly 2070 translates the fourth shift rail and fork assembly 94B. A second outlet port 2064I of the fourth logic valve 2064 is connected by a line 2078 to a port 2080A at one end of a fifth, preferably dual area piston and cylinder assembly 2080. A port 2080B at the other end of the fifth piston and cylinder assembly 2080 is connected by a line 2082 to a fourth outlet port 2064J of the fourth logic valve 2064. The fifth piston and cylinder assembly 2080 translates the fifth shift rail and fork assembly 94C. It will be appreciated that all of the piston and cylinder assemblies 2044, 2050, 2060, 2070 and 2080 may include dual area pistons, if desired, or that such assemblies may include single area pistons with associated feedback and control assemblies or combinations thereof, as illustrated.

Operation of the first embodiment of the hydraulic control system 2000 essentially involves the selection of a desired gear ratio in the transmission 60 by the transmission control module TCM and selection and activation of the pressure control solenoid valves 140 and 190 to independently provide pressurized hydraulic fluid to the input clutch side or the gear shift side of the hydraulic control system 2000, activation of the pressure or flow control solenoid valves 2022 and 2026 to provide controlled flow and pressure of hydraulic fluid to the logic valves 2020, 2040, 2054 and 2064 and activation of the two position solenoid valves 2018, 2028 and 2032 to position the logic valve spools to direct pressurized hydraulic fluid flow to the correct sides of the piston and cylinder assemblies 2044, 2050, 2060, 2070 and 2080 to translate the shift rails 84A, 84B, 94A, 94B and 94C to engage the desired gear. Once this has occurred, the input clutch 64A or 64B associated with the countershaft 68A, 68B or 68C of the selected gear is engaged by activation of one of the two piston and cylinder assemblies 160 or 210.

Figure 2A:
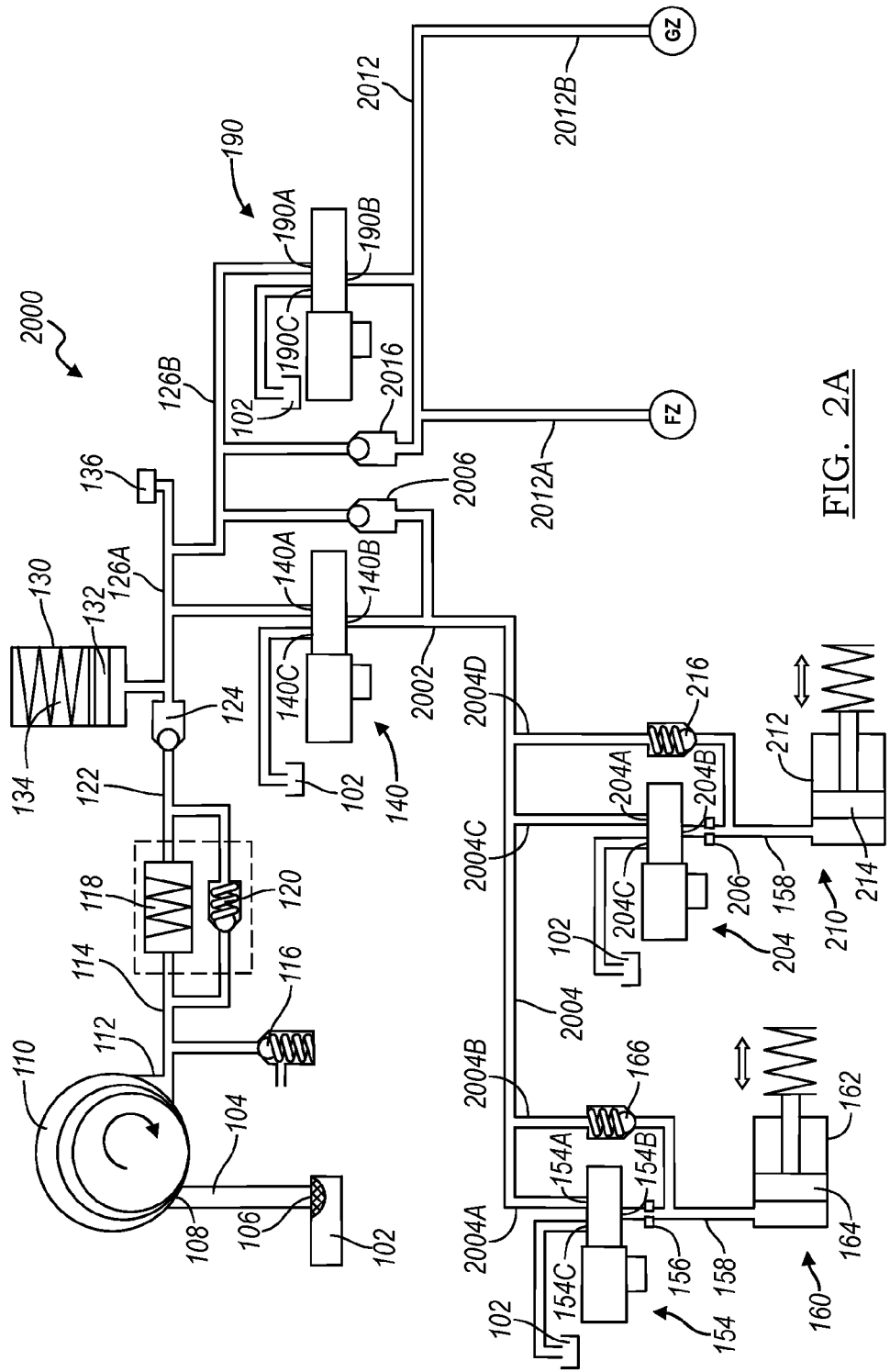
FIGS. 2A, 2B and 2C are schematic flow diagrams of a first embodiment of a hydraulic control system according to the present invention for a dual clutch automatic transmission.
Figure 2B:
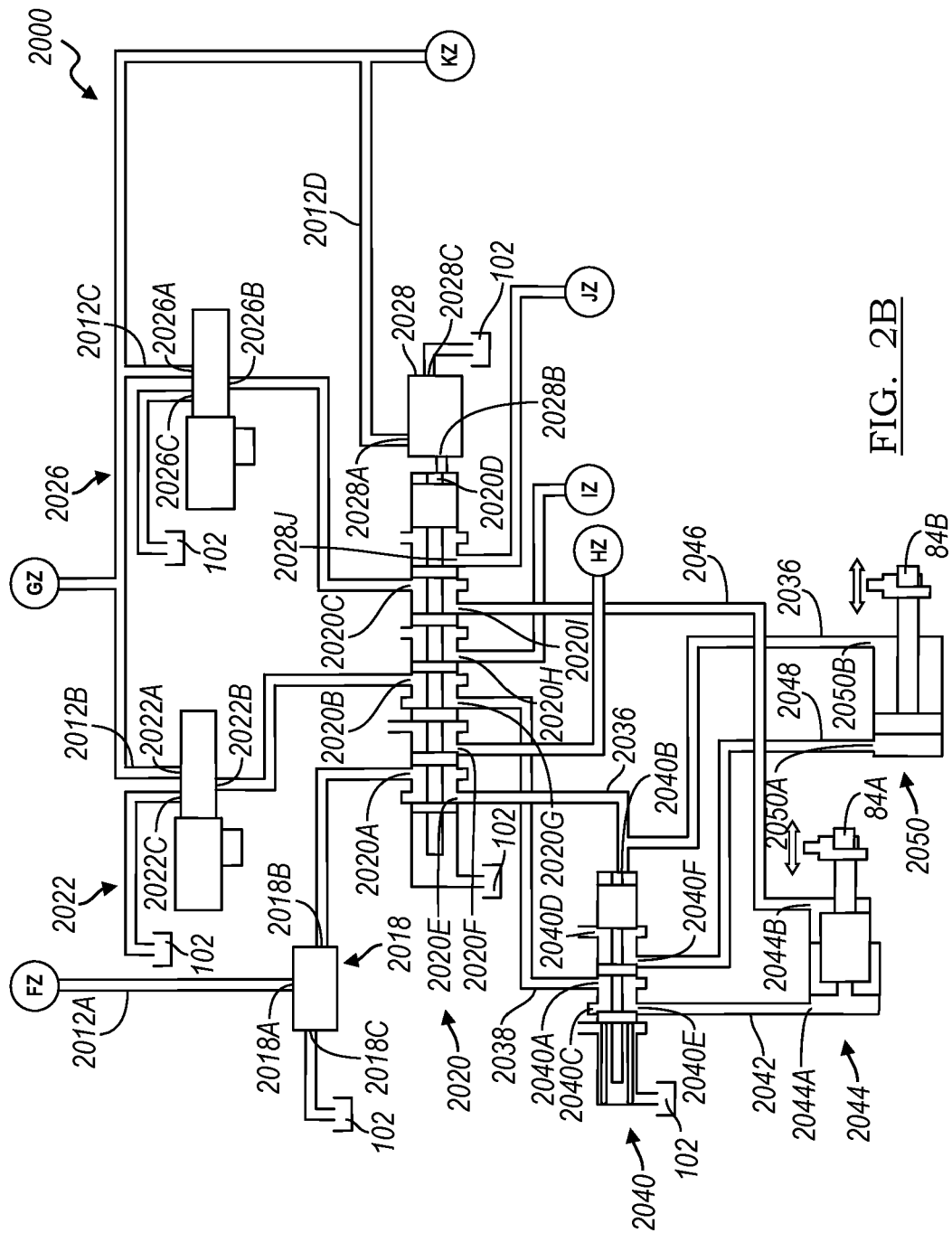
Figure 2C:
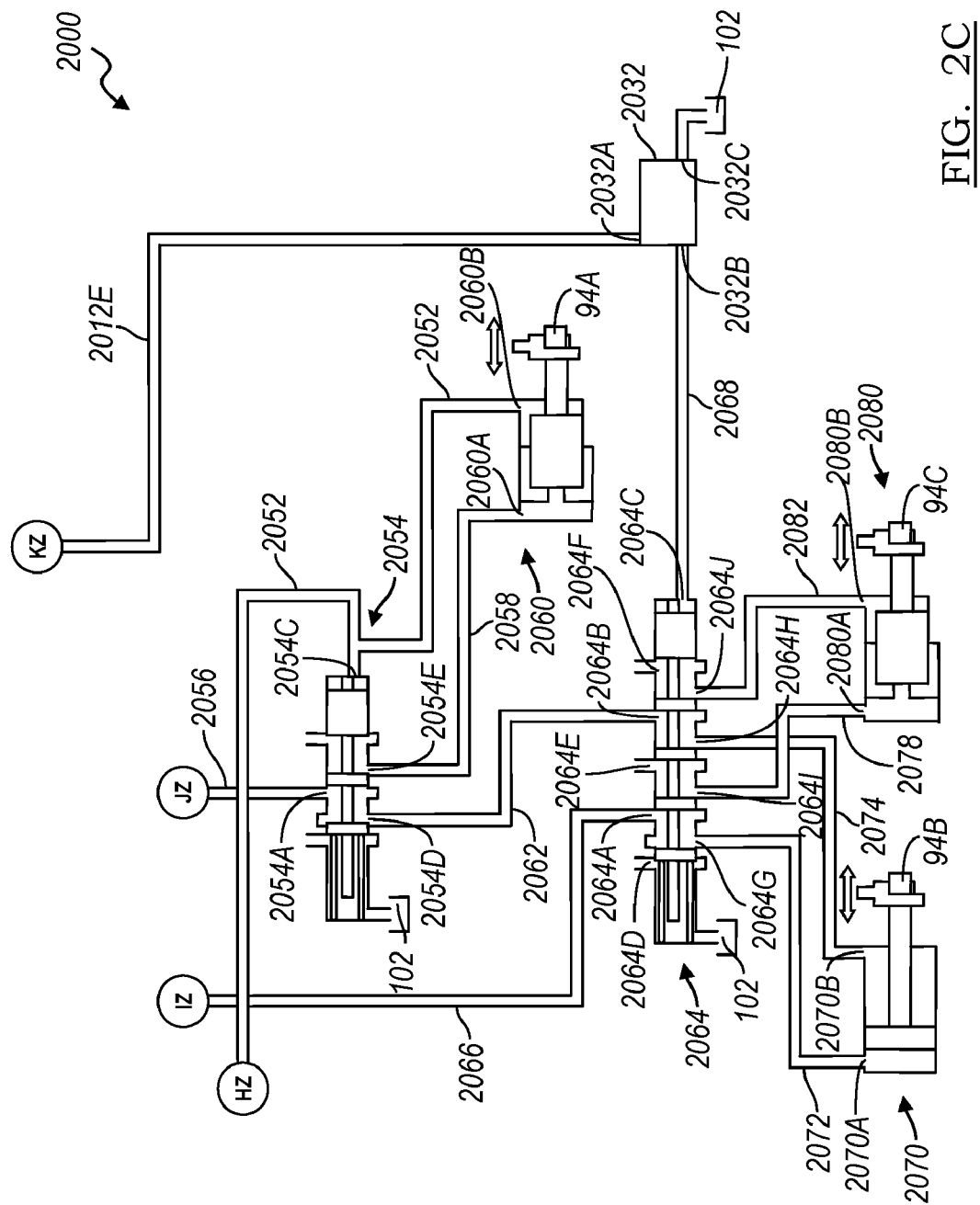
Figure 3A:
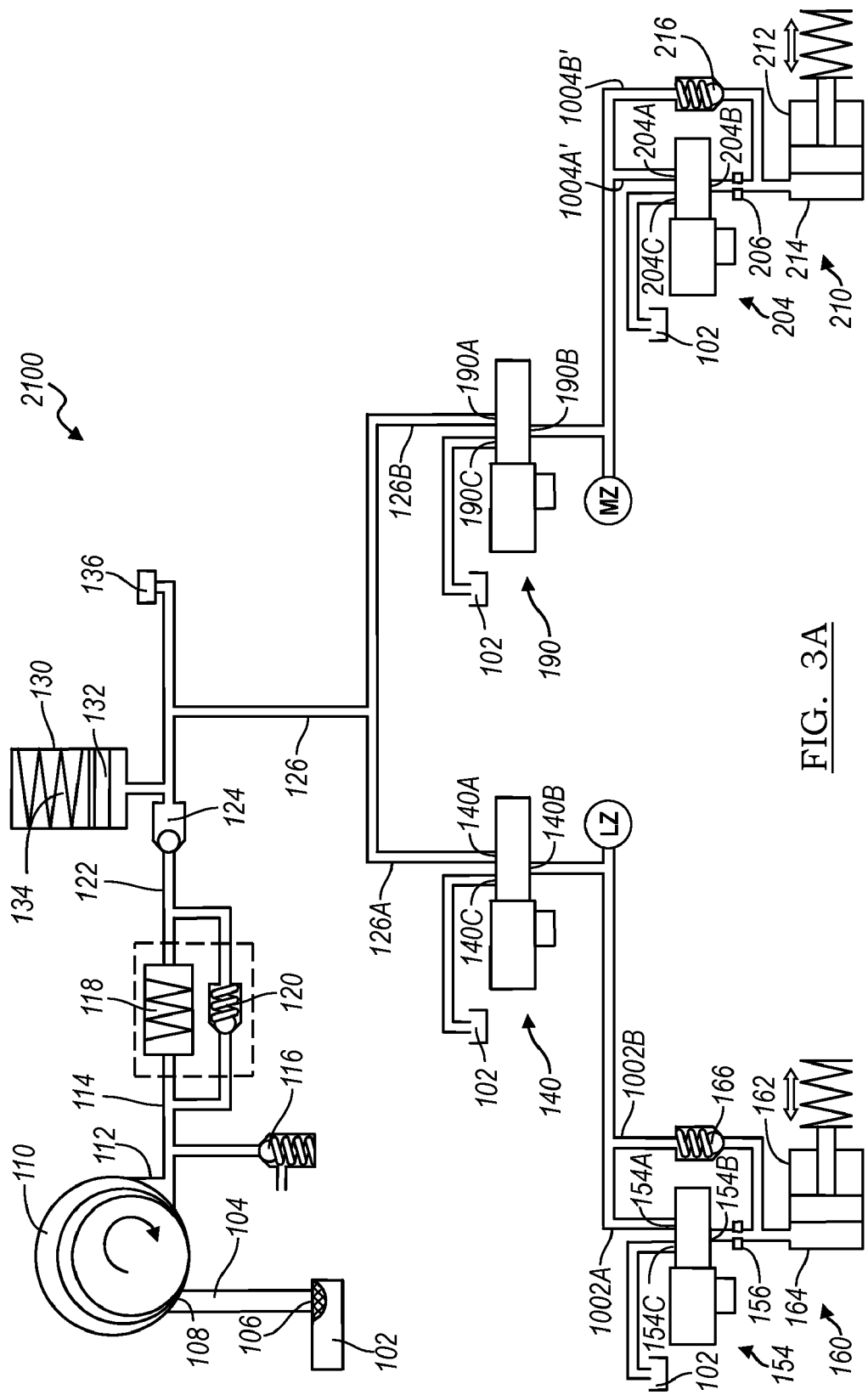
FIGS. 3A, 3B and 3C are schematic flow diagrams of a second embodiment of a hydraulic control system according to the present invention for a dual clutch automatic transmission.
Figure 3B:
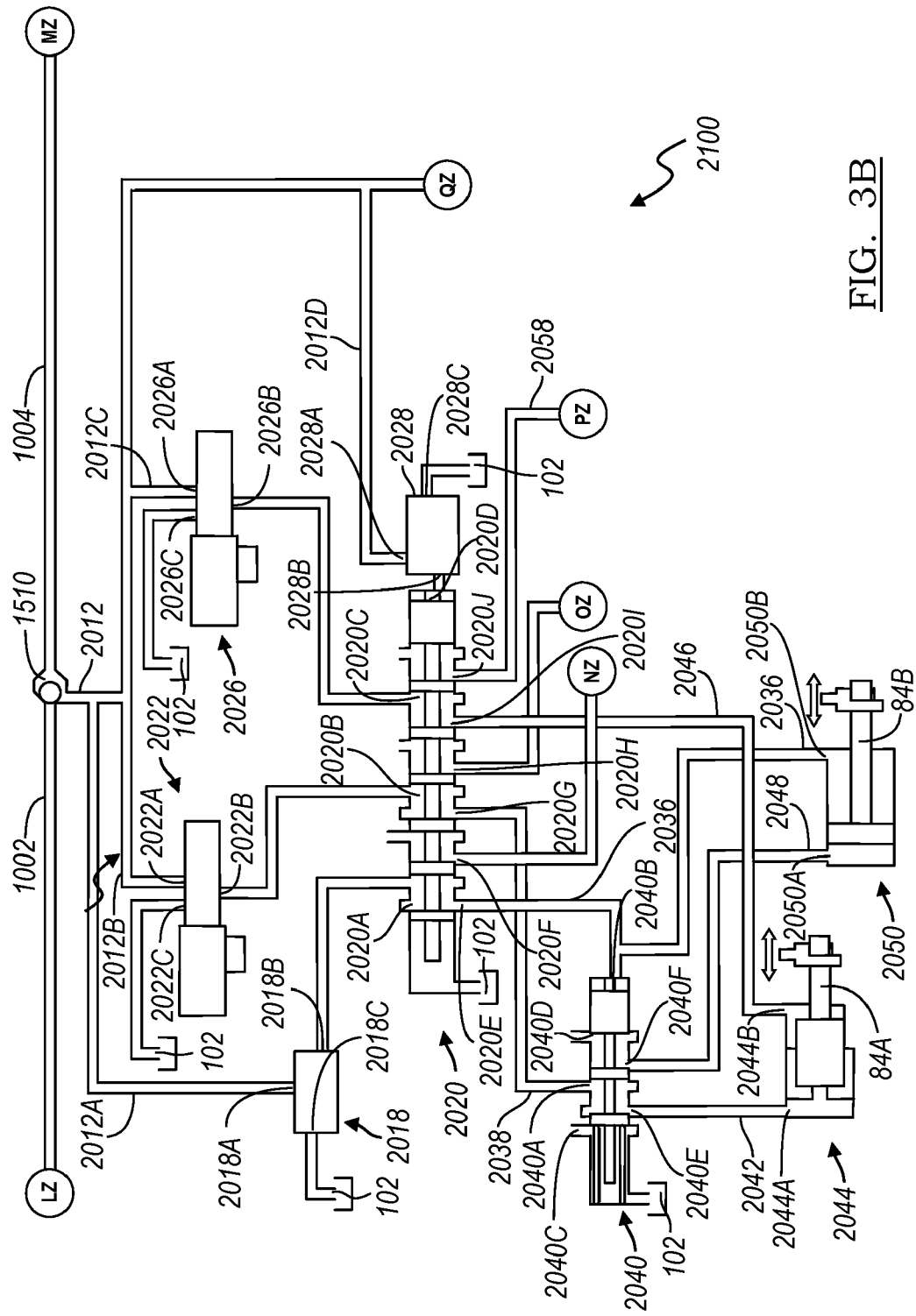
Figure 3C:
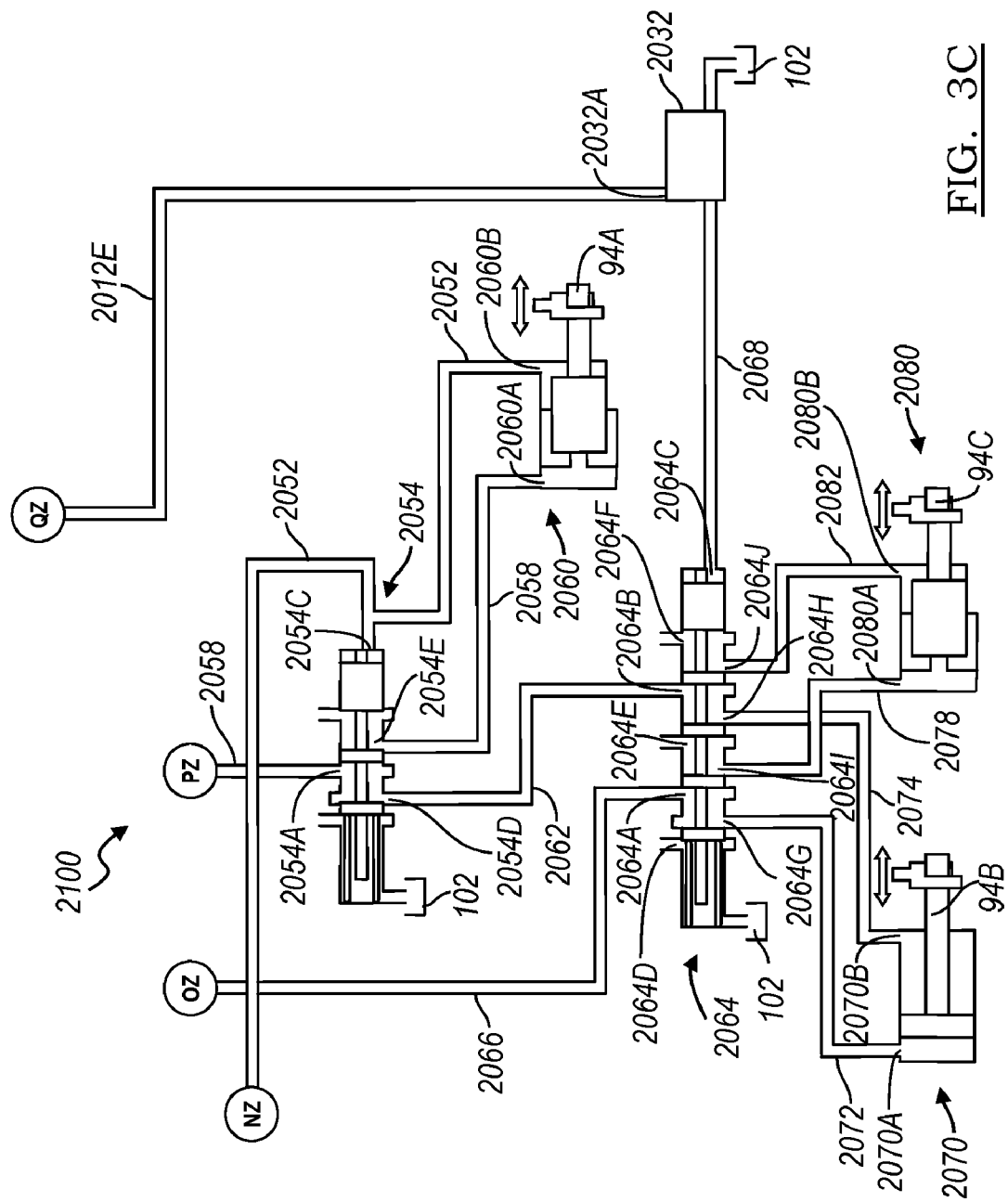

A convenient example of operation may be presented by describing same with the spools of the logic valves 2020, 2040, 2054 and 2064 in the positions illustrated in FIGS. 2B and 2C. Activation of the first pressure or flow control solenoid valve 2022 provides hydraulic fluid to the second inlet port 2020B of the first logic valve 2020, through the line 2038 to the second logic valve 2040 and through the line 2042 to one end of the first piston and cylinder assembly 2044. The first shift rail 84A will then translate to the right (to the left in FIG. 1) and engage, for example, sixth gear. The shift is completed by engaging the appropriate input clutch. If, on the other hand, the second pressure or flow control solenoid valve 2026 is activated, hydraulic fluid flow occurs through the third inlet port 2020C of the first logic valve 2020 and the line 2046, either returning the first shift rail 84A to neutral or moving the shift rail 84A all the way to the left to the position illustrated in FIG. 2B to engage, for example, second gear. The choice of the center (neutral) or left position is commanded by the transmission control module TCM with linear position information from, for example, the first linear position sensor 88A illustrated in FIG. 1. A similar pattern of valve activation and logic valve spool translation provides the seven forward and reverse gears of the transmission 60. For example, if the second two position solenoid valve 2028 is energized, the spool of the first logic valve 2020 translates to the left in FIG. 2B, shifting its hydraulic fluid outputs to the outlet ports 2020F, 2020H and 2020J and the hydraulic circuitry illustrated in FIG. 2C.

Referring now to FIGS. 1, 3A, 3B and 3C, a second embodiment of a hydraulic control system according to the present invention is illustrated and generally designated by the reference number 2100. The second embodiment 2100 of the hydraulic control system, as stated above, includes, in common with the other embodiment, the sump 102, the pump 110, the filters 106 and 118, the accumulator 130 and the other components of the hydraulic fluid supply and thus they will not be further described. It should be noted that the filters 106 and or 118 can be omitted without departing from the scope of this invention.

Additionally, the portion of the second embodiment 2100 associated with independent operation of the two sides or sections of the transmission 60 and associated clutches 64A and 64B includes the main supply line 126 which bifurcates into the first main supply line 126A and the second main supply line 126B. The first main supply line 126A communicates with the inlet port 140A of the first pressure control solenoid valve 140 and the second main supply line 126B communicates with the inlet port 190A of the second pressure control solenoid valve 190. The outlet port 140B of the first pressure control solenoid valve 140 communicates with a first supply manifold 1002 and the outlet port 190B of the second pressure control solenoid valve 190 communicates with a second supply manifold 1004. The exhaust ports 140C and 190C communicate with the sump 102.

Similarly, the second embodiment 2100 includes the components associated with activation of the first clutch 64A, such as the electric pressure or flow clutch control solenoid valve 154, which receives hydraulic fluid from a first branch 1002A of the first supply manifold 1002, the orifice 156, the first clutch piston and cylinder assembly 160 and the first clutch pressure limit control valve 166 which communicates with a second branch 1002B of the first supply manifold 1002. The second embodiment 2100 also includes the components associated with activation of the second clutch 64B, such as the second electric pressure or flow clutch control solenoid valve 204 which receives hydraulic fluid from a first branch 1004A of the second supply manifold 1004, the orifice 206, the second clutch piston and cylinder assembly 210 and the second clutch pressure limit control valve 216 which communicates with a second branch 1004B of the second supply manifold 1004. It should be noted that the pressure control valves 166 and 216 can be eliminated depending upon the system requirements.

The second embodiment 2100 also includes a two inlet check valve 1510 disposed between and communicating with the first supply manifold 1002 and the second supply manifold 1004. The first supply manifold 1002 or the second supply manifold 1004 having the higher pressure causes the check ball to close off the lower pressure supply manifold and allow communication between the higher pressure supply manifold and the second, main manifold 2012. This achieves lower hydraulic fluid consumption rates and permits independent gear and clutch actuator control. However, it should be noted that instead of feeding the main manifold 2012 through the two inlet check valve 1510, it could be connected to the higher pressure main supply line 126 without loss of functionality.

The portion of the second embodiment 2100 associated with gear selection and engagement is the same as the corresponding portion of the first embodiment 2000 illustrated in FIGS. 2B and 2C. Thus, the second embodiment 2100 also includes the first two position (on-off) solenoid valve 2018, the first pressure or flow control solenoid valve 2022, the second pressure or flow control solenoid valve 2026, the first spool or logic valve 2020, the second two position (on-off) solenoid valve 2028, the third two position (on-off) solenoid valve 2032, the second spool or logic valve 2040, the third spool or logic valve 2054 and the fourth spool of logic valve 2064.

Similarly, the first, preferably dual area piston and cylinder assembly 2044 is connected to the first outlet port 2040E of the second logic valve 2040 by the line 2042 and to the fifth outlet port 20201 of the first logic valve 2020 by the line 2046; the second piston and cylinder assembly 2050 is connected to the second outlet port 2040F of the second logic valve 2040 by the line 2048 and to the control port 2040B of the second logic valve 2040 by the line 2036. The third, preferably dual area piston and cylinder assembly 2060 is connected to the second outlet port 2054E of the third logic valve 2054 by the line 2058 and to the control port 2054C of the third logic valve 2054 by the line 2052. The fourth piston and cylinder assembly 2070 is connected to the first outlet port 2064G of the fourth logic valve 2064 by the line 2072 and the third outlet port 2064H by the line 2074. The fifth, preferably dual area piston and cylinder assembly 2080 is connected to the second outlet port 2064I of the fourth logic valve 2064 by the line 2078 and the fourth outlet port 2064J by the line 2082.

It will be appreciated that the hydraulic control systems according to the two embodiments of the present invention achieve significant improvements in reduced energy consumption and shift performance not only because of the incorporation of the dedicated pump and accumulator but also because of the use of pressure and flow control solenoid valves which allow the majority of the hydraulic system components to be turned off in normal, steady-state, operation. It should also be appreciated that slight variations in logic valve connections and alternate piston and shift rail connections are possible in order to adapt to different five actuator transmissions.

Additionally, these solenoid valves and the linear position sensors on each piston and cylinder shift actuator assembly which provide real time data to the transmission control module regarding the instantaneous positions of the actuators, shift rails and clutches, achieve gear selection and clutch operation that is rapid, positive and efficient without overshoot and wasted energy.

Similarly, the configurations of the two embodiments and the position feedback provided by the linear position sensors permits and facilitates rapid gear sequencing and improved, i.e., reduced, shift times.

Finally, the separation of hydraulic fluid supply and control functions into two regions or sections relating to the input clutches and the gear selection components, allows precise and independent control of engagement and operating pressures of the clutches and shift actuators.

The description of the invention is merely exemplary in nature and variations that do not depart from the gist of the invention are intended to be within the scope of the invention. Such variations are not to be regarded as a departure from the spirit and scope of the invention.

What is claimed is:

1. A hydraulic control system for a dual clutch transmission comprising, in combination, a source of pressurized hydraulic fluid having a pump, a first pressure control solenoid valve having an inlet connected to said source of hydraulic fluid and a first outlet, a first clutch actuator assembly in fluid communication with said first outlet and including a first piston and cylinder assembly and a first solenoid valve for selectively supplying hydraulic fluid to said first piston and cylinder assembly, a second clutch actuator assembly in fluid communication with said first outlet and including a second piston and cylinder assembly and a second solenoid valve for selectively supplying hydraulic fluid to said second piston and cylinder assembly, a second pressure control solenoid valve having an inlet connected to said source of hydraulic fluid and a second outlet, a first two position solenoid valve having an inlet connected to said second outlet and an outlet, a first pressure or flow control solenoid valve having an inlet connected to said second outlet and having an outlet, a second pressure or flow control solenoid valve having an inlet connected to said second outlet and having an outlet, a first logic valve having a first inlet port connected to said outlet of said first two position solenoid valve, a second inlet port connected to said outlet of said first pressure or flow control solenoid and a third inlet port connected to said outlet of said second pressure or flow control solenoid valve, a plurality of exhaust ports, a control port, a first outlet port, a second outlet port, a third outlet port, a fourth outlet port, a fifth outlet port and a sixth outlet port, a second two position solenoid valve having an inlet connected to said second outlet and an outlet connected to said control port of said first logic valve, a second logic valve having a first inlet port connected to said third outlet port of said first logic valve, a control port connected to said first outlet port of said first logic valve, a first outlet port and a second outlet port, a first gear selection piston and cylinder assembly having a first port connected to said first outlet port of said second logic valve and a second port connected to said to said fifth outlet of port said first logic valve, a second gear selection piston and cylinder assembly having a first port connected to said second outlet port of said second logic valve and a second port connected to said to said control port of said second logic valve, a third logic valve having an inlet port connected to said sixth outlet port of said first logic valve, a control port connected to said second outlet port of said first logic valve, a first outlet port and a second outlet port, a third gear selection piston and cylinder assembly having a first port connected to said second outlet port of said third logic valve and a second port connected to said to said control port of said third logic valve, a fourth logic valve having a first inlet port connected to said fourth outlet port of said first logic valve and a second inlet port connected to said first outlet port of said third logic valve, a plurality of exhaust ports, a control port, a first outlet port, a second outlet port, a third outlet port and a fourth outlet port, a third two position solenoid valve having an inlet connected to said second outlet and an outlet connected to said control port of said fourth logic valve, a fourth gear selection piston and cylinder assembly having a first port connected to said first outlet port of said fourth logic valve and a second port connected to said third outlet port of said fourth logic valve, and a fifth gear selection piston and cylinder assembly having a first port connected to said second outlet port of said fourth logic valve and a second port connected to said to said fourth outlet port of said fourth logic valve.

2. The hydraulic control system of claim 1 further including a check valve disposed in fluid communication with said inlet and said outlet of each of said pressure control solenoid valves.

3. The hydraulic control system of claim 1 further including a linear position sensor operably associated with each of said gear selection piston and cylinder assemblies.

4. The hydraulic control system of claim 1 further including a transmission control module having a plurality of inputs and outputs, said outputs operably coupled to said valves and a linear position sensor for sensing the output of each of said gear selection piston and cylinder assemblies and having an output coupled to one of said control module inputs.

5. The hydraulic control system of claim 1 wherein said piston and cylinder assemblies each include a shift rail coupled to said piston and a shift fork coupled to said shift rail.

6. The hydraulic control system of claim 1 wherein said source of pressurized hydraulic fluid further includes an accumulator, a filter, and a check valve.

7. The hydraulic control system of claim 1 wherein spools of said logic valves are translated by hydraulic pressure.

8. A hydraulic control system for a dual clutch transmission comprising, in combination, a source of pressurized hydraulic fluid including pump and an accumulator, a first pressure control solenoid valve having an inlet connected to said source of hydraulic fluid and a first outlet, a first clutch actuator in fluid communication with said first outlet and including a first piston and cylinder and a first solenoid valve for selectively supplying hydraulic fluid to said first piston and cylinder, a second clutch actuator in fluid communication with said first outlet and including a second piston and cylinder and a second solenoid valve for selectively supplying hydraulic fluid to said second piston and cylinder, a second pressure control solenoid valve having an inlet connected to said source of hydraulic fluid and a second outlet, a first two position solenoid valve having an inlet connected to said second outlet and an outlet, a first pressure or flow control solenoid valve having an inlet connected to said second outlet and having an outlet, a second pressure or flow control solenoid valve having an inlet connected to said second outlet and having an outlet, a first logic valve having a first inlet connected to said outlet of said first two position solenoid valve, a second inlet connected to said outlet of said first pressure or flow control solenoid and a third inlet connected to said outlet of said second pressure or flow control solenoid valve, a plurality of exhaust ports, a control port, a first outlet, a second outlet, a third outlet, a fourth outlet, a fifth outlet and a sixth outlet, a second two position solenoid valve having an inlet connected to said second outlet and an outlet connected to said control port of said first logic valve, a second logic valve having a first inlet connected to said third outlet of said first logic valve, a control port connected to said first outlet of said first logic valve, a first outlet and a second outlet, a first gear selection piston and cylinder assembly having a first port connected to said first outlet of said second logic valve and a second port connected to said to said fifth outlet of said first logic valve, a second gear selection piston and cylinder assembly having a first port connected to said second outlet of said second logic valve and a second port connected to said to said control port of said second logic valve, a third logic valve having an inlet connected to said sixth outlet of said first logic valve, a control port connected to said second outlet of said first logic valve, a first outlet and a second, a third gear selection piston and cylinder assembly having a first port connected to said second outlet of said third logic valve and a second port connected to said to said control port of said third logic valve, a fourth logic valve having a first inlet connected to said fourth outlet of said first logic valve and a second inlet connected to said first outlet of said third logic valve, a plurality of exhaust ports, a control port, a first outlet, a second outlet, a third outlet and a fourth outlet, a third two position solenoid valve having an inlet connected to said second outlet and an outlet connected to said control port of said fourth logic valve, a fourth gear selection piston and cylinder assembly having a first port connected to said first outlet of said fourth logic valve and a second port connected to said third outlet of said fourth logic valve, and a fifth gear selection piston and cylinder assembly having a first port connected to said second outlet of said fourth logic valve and a second port connected to said to said fourth outlet of said fourth logic valve.

9. The hydraulic control system of claim 8 further including a check valve disposed in fluid communication with said inlet and said outlet of each of said pressure control solenoid valves.

10. The hydraulic control system of claim 8 further including a linear position sensor operably associated with each of said gear selection piston and cylinder assemblies.

11. The hydraulic control system of claim 8 further including a transmission control module having a plurality of inputs and outputs, said outputs operably coupled to said valves and a linear position sensor for sensing the output of each of said gear selection piston and cylinder assemblies and having an output coupled to one of said control module inputs.

12. The hydraulic control system of claim 8 wherein said piston and cylinder assemblies each include a shift rail coupled to said piston and a shift fork coupled to said shift rail.

13. The hydraulic control system of claim 8 wherein said source of pressurized hydraulic fluid further includes an accumulator, a filter, and a check valve.

14. The hydraulic control system of claim 8 wherein spools of said logic valves are translated by hydraulic pressure.

15. A hydraulic control system for a dual clutch transmission comprising, in combination, a source of pressurized hydraulic fluid including a pump and an accumulator, a first pressure control solenoid valve having an inlet connected to said source of hydraulic fluid and a first outlet, a first clutch actuator in fluid communication with said first outlet and including a first piston and cylinder and a first solenoid valve for selectively supplying hydraulic fluid to said first piston and cylinder, a second pressure control solenoid valve having an inlet connected to said source of hydraulic fluid and a second outlet, a second clutch actuator in fluid communication with said second outlet and including a second piston and cylinder and a second solenoid valve for selectively supplying hydraulic fluid to said second piston and cylinder, a check valve having a first inlet communicating with said first outlet, a second inlet communicating with said second outlet and an outlet, a first two position solenoid valve having an inlet connected to said outlet of said check valve and an outlet, a first pressure or flow control solenoid valve having an inlet connected to said outlet of said check valve and having an outlet, a second pressure or flow control solenoid valve having an inlet connected to said outlet of said check valve and having an outlet, a first logic valve having a first inlet connected to said outlet of said first two position solenoid valve, a second inlet connected to said outlet of said first pressure or flow control solenoid and a third inlet connected to said outlet of said second pressure or flow control solenoid valve, a plurality of exhaust ports, a control port, a first outlet, a second outlet, a third outlet, a fourth outlet, a fifth outlet and a sixth outlet, a second two position solenoid valve having an inlet connected to said outlet of said check valve and an outlet connected to said control port of said first logic valve, a second logic valve having a first inlet connected to said third outlet of said first logic valve, a control port connected to said first outlet of said first logic valve, a first outlet and a second outlet, a first gear selection piston and cylinder assembly having a first port connected to said first outlet of said second logic valve and a second port connected to said to said fifth outlet of said first logic valve, a second gear selection piston and cylinder assembly having a first port connected to said second outlet of said second logic valve and a second port connected to said to said control port of said second logic valve, a third logic valve having an inlet connected to said sixth outlet of said first logic valve, a control port connected to said second outlet of said first logic valve, a first outlet and a second, a third gear selection piston and cylinder assembly having a first port connected to said second outlet of said third logic valve and a second port connected to said to said control port of said third logic valve, a fourth logic valve having a first inlet connected to said fourth outlet of said first logic valve and a second inlet connected to said first outlet of said third logic valve, a plurality of exhaust ports, a control port, a first outlet, a second outlet, a third outlet and a fourth outlet, a third two position solenoid valve having an inlet connected to said outlet or said check valve and an outlet connected to said control port of said fourth logic valve, a fourth gear selection piston and cylinder assembly having a first port connected to said first outlet of said fourth logic valve and a second port connected to said third outlet of said fourth logic valve, and a fifth gear selection piston and cylinder assembly having a first port connected to said second outlet of said fourth logic valve and a second port connected to said to said fourth outlet of said fourth logic valve.

16. The hydraulic control system of claim 15 further including a second check valve disposed in fluid communication with an inlet and an outlet of said first solenoid valve of said first clutch actuator and a third check valve disposed in fluid communication with an inlet and an outlet of said second solenoid valve of said second clutch actuator.

17. The hydraulic control system of claim 15 further including a linear position sensor operably associated with each of said gear selection piston and cylinder assemblies.

18. The hydraulic control system of claim 15 further including a transmission control module having a plurality of inputs and outputs, said outputs operably coupled to said valves and a linear position sensor for sensing the output of each of said gear selection piston and cylinder assemblies and having an output coupled to one of said control module inputs.

* * * * *